United States Patent [19]
Grobecker et al.

[11] Patent Number: 4,916,567
[45] Date of Patent: Apr. 10, 1990

[54] STORAGE CASSETTE FOR A DISC-SHAPED INFORMATION CARRIER

[75] Inventors: Hermann Grobecker, Garbsen; Werner Heuer, Lehrte; Alois Pichler, Isernhagen, all of Fed. Rep. of Germany

[73] Assignee: Philips & Dupont Optical Co., New York, N.Y.

[21] Appl. No.: 224,104

[22] Filed: Jul. 26, 1988

[30] Foreign Application Priority Data

Aug. 3, 1987 [DE] Fed. Rep. of Germany ....... 3725616

[51] Int. Cl.⁴ .............................................. G11B 23/02
[52] U.S. Cl. ................................................... 360/133
[58] Field of Search .................... 360/133, 132, 97–99; 206/444

[56] References Cited

FOREIGN PATENT DOCUMENTS 55-52561 4/1980 Japan ................................... 360/133
60-50680 3/1985 Japan ................................... 360/133

OTHER PUBLICATIONS

IBM/TDB, vol. 26, No. 3A, Aug. 1983, pp. 1208–1209, "Magnetic Disk Container" by Bachman et al.
IBM/TDB, vol. 13, No. 5, Oct. 1970, p. 1242, "Disk Pack Locating Device" by Kluble.

*Primary Examiner*—John H. Wolff
*Attorney, Agent, or Firm*—John F. Moran

[57] ABSTRACT

Cassette has a bottom section a pivotable cover section, and a tray which is constructed to be inserted into the bottom section and to hold a disc at its outer edge by means of at least three retaining elements arranged on the tray. One of the retaining elements is movable, and transport protection is provided by a latching element arranged on the cover section, which latching element latches the resilient retaining element in its normal position when the cover section is in its closed position.

5 Claims, 2 Drawing Sheets

STORAGE CASSETTE FOR A DISC-SHAPED INFORMATION CARRIER

BACKGROUND OF THE INVENTION

The invention relates to a storage cassette comprising a bottom section, a pivotable cover section, and a tray which is constructed to be inserted into the bottom section and to receive a disc-shaped information carrier or disc. The discs can be held in the tray at its outer edge by means of at least three retaining elements provided on the tray, at least one retaining element being constructed to be movable and, in its normal position, urging the disc against the other retaining elements under spring force to hold said information carrier in position.

Such storage cassettes are known, for example from European Patent Application No. 0,188,663. An element for receiving and holding a rigid circular information disc comprises a tray having a recess and adapted to be inserted into a storage cassette, which tray has retaining elements for holding the information disc. The facing retaining elements act on the edge of an inserted information disc. At least one of these retaining elements is resilient. The tray has a double function, namely holding the information disc in the storage cassette during storage and enabling the information disc to be inserted into the reproducing apparatus without the disc being touched. If desired, however, the disc may be removed from the tray and inserted into the player by hand.

When such a tray having a resilient retaining element is subjected to shocks this element may spring back to such an extent that the disc is released and may then be knocked to and fro inside the package and may be damaged.

SUMMARY OF THE INVENTION

At least one latching element is arranged on the cover section, which latching element latches the resilient retaining element in its normal position when the cover section is in its closed position.

Such a latching element arranged on the cover section ensures that the movable resilient retaining element cannot spring even under the influence of mechanical shocks. Since the latching element is arranged on the cover section the resilient retaining element is automatically latched in its normal position when the cover section is swung down onto the bottom section. When the cover section is open it is nevertheless possible to remove the disc if desired, in that the resilient retaining element is moved out of its normal position by hand, so that the disc is released.

Suitably, the latching element is arranged in such a way that it does not exert any force on the resilient retaining element as long as the retaining element is in its normal position. This ensures that an inserted disc is not subjected to any additional forces which might warp the disc.

The latching element can be manufactured economically because the cover section merely has to be provided with an appropriate device which can be moulded together with the cover section and consequently requires no additional expenditure.

In a further embodiment of the invention the latching element on the cover section is constructed as a latching nose which in the closed position of the cover section engages behind the movable retaining element in such a way that the retaining element cannot be moved out of its normal position.

In its normal position the movable retaining element holds an inserted disc so that it cannot be removed unless the movable retaining element is moved out of its normal position against the spring force. In accordance with the invention to latching element is suitably arranged on the cover section in such a way that it engages behind the movable retaining element, so that this retaining element cannot be moved out of its normal position. For this purpose the cover section is provided with a latching nose which engages behind the movable retaining element in the closed position of the cover section. This simply ensures that in the closed position of the cover, for example during transport, the movable retaining element cannot move out of its normal position and thus release an inserted disc. A further advantage of such an arrangement is that no additional transport-protection means are necessary on the tray or on the movable latching element on this tray. It is adequate to provide the cover section with a latching nose as described above.

In a further embodiment of the invention the insert-type tray is provided with a grip member near the pivotal axis of the cover section and the movable element on the tray and the latching nose on the cover section are arranged in the proximity of the grip member.

If both the grip member on the tray and the movable retaining element are arranged in such a way that they are situated near the pivotal axis of the cover section, the latching nose will also be situated near the grip member. This has the advantage that the latching nose is situated at a location of the cover section where it is not in the way. This is important because the cover section is generally provided with means for receiving a leaflet. If the latching nose is situated near the pivotal axis of the cover section it will not obstruct insertion of such a leaflet.

DETAILED DESCRIPTION OF THE PREFERRED EMBODIMENTS

Figure 1:
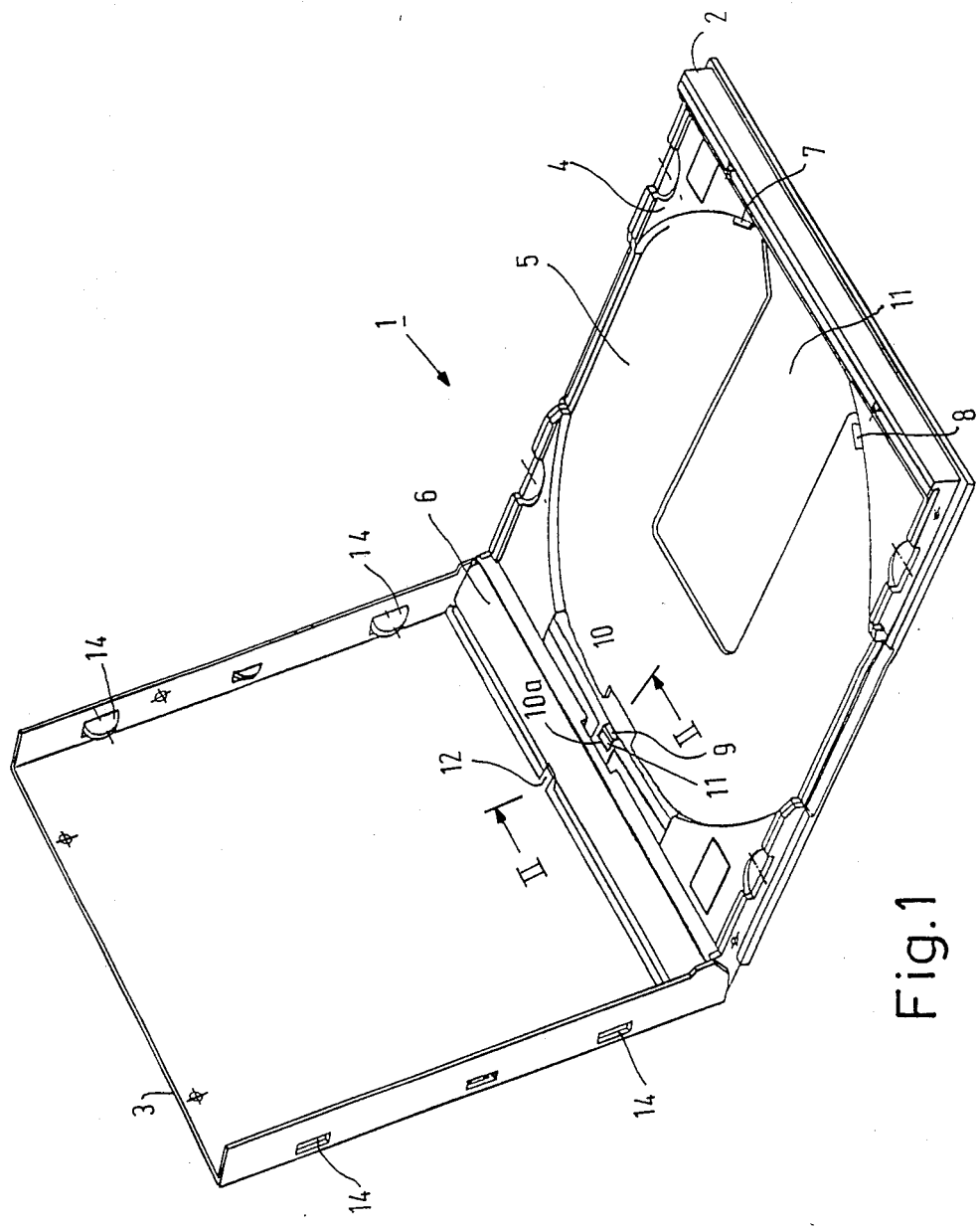
FIG. 1 is a perspective of the storage cassette with a tray inserted in the bottom section.

The storage cassette shown in FIG. 1 serves for receiving and storing disc-shaped information carriers in particular optically readable information carriers such as, for example, a Compact Disc. The storage cassette 1 comprises a bottom section 2 and a pivotable cover section 3. Both the bottom section 2 and the cover section 3 are generally made of transparent plastic. The cover section 3 is pivotally connected to the bottom section 2. A tray 4 for receiving a disc is inserted in the bottom section 2. This tray 4 has a circular recess 5 adapted to receive the disc. A grip member 6 is arranged at one side adjacent the recess 5. This grip member 6 is situated near the pivotal axis of the cover section 3, which is pivotally connected to the bottom section.

In the recess 5 three retaining elements are arranged at the edge of the recess 5 to hold an inserted disc at its outer edge. Two retaining elements 7 and 8 arranged at the outer edge of the recess 5 opposite the grip member 6. These are not movable. The retaining elements 7 and 8 are spaced at such a distance from one another that an inserted disc can move to and fro to a minimal extent. A third retaining element 9 is movably arranged opposite the retaining elements 7 and 8, i.e. in the proximity of the grip member 6 at the edge of the recess 5. For this purpose the retaining element 9 is arranged on a leaf spring 10. In the rest position of the leaf spring 10 and the retaining element 9 a disc is clamped between the retaining elements 7, 8 and 9. The retaining element 9 can be moved out of its normal position by moving back the leaf spring 10 so that a disc clamped between the retaining elements 7, 8 and 9 can be removed from the recess 5. Such a removal is possible by hand in that the leaf spring 10 and the retaining element 9 are moved back by hand, or automatically in an apparatus. In the latter case the entire tray 4 together with an inserted information carrier held between the retaining elements 7, 8 and 9 is inserted into a player. In the player the leaf spring 10 and consequently the retaining element 9 are moved back by a suitable means, so that the inserted disc is released and can be played. For this purpose an aperture 11 is formed in the recess 5 to allow a disc in the recess 5 to be scanned from the underside, for example by means of a laser beam.

A problem associated with such a storage cassette and the tray which can be inserted therein is that during transport the leaf spring 10 together with the retaining element 9 arranged on it may spring back inadvertently. When during transport the tray is subjected to shocks an information carrier contained in the recess 5 and held between the retaining elements 7, 8 and 9 exerts corresponding forces on the retaining element 9 and hence on the leaf spring 10, so that these elements may be moved outwards out of their normal position. An inserted disc can then become disengaged from at least one of the retaining elements 7, 8 or 9, so that it is knocked to and from inside the storage cassette (while the cover section 3 is closed). This is to be avoided because in particular in the case of optically readable information carriers scratches or other forms of damage to their surfaces must be excluded. Moreover, the information carrier may then become warped.

In order to preclude this problem, in accordance with the invention, the over section 3 is provided with a latching nose 12 near which it is pivoted relative to the bottom section 2. This latching nose 12 projects substantially perpendicularly from the cover section 3 and is arranged on this section in such a way that in the closed position of the cover section 3 it engages behind the retaining element 9 on the leaf spring 10. For this purpose the leaf spring 10 is formed with an aperture behind the latching element 9, in which aperture the latching nose 12 is engageable. The latching nose 12 is arranged in such a way that it engages the aperture when a disc is clamped in the recess 5 between the retaining elements 7, 8 and 9. The retaining element 9 is then latched in this normal position and remains in this position when it is subjected to forces.

Since it is arranged on the cover section the latching nose 12 does not impair normal operation of the tray, i.e. an inserted disc can be removed from the recess 5 in the tray 4 both manually and also mechanically in a suitable player.

Since the latching nose 12 is arranged near the pivotal axis of the cover section it does not obstruct insertion of a leaflet, not shown, into the cover section 3. For this purpose the side walls of the cover section 3 are provided with holders 14 behind which the leaflet can be inserted.

Figure 2:
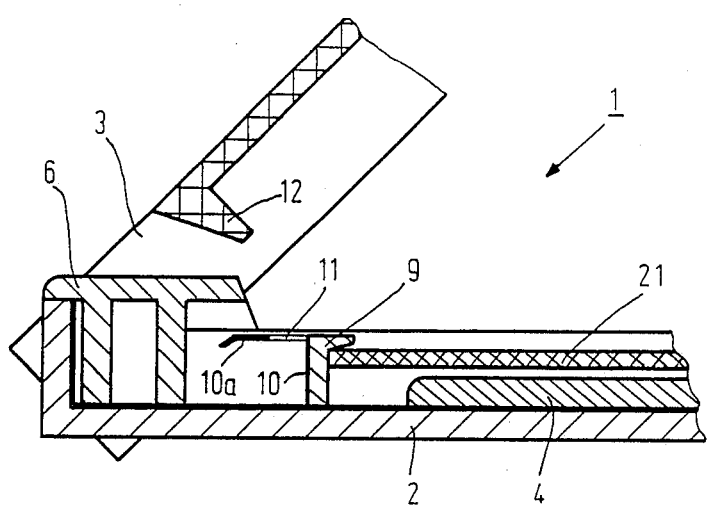
FIG. 2 is a section of the open cassette with a disc therein.

FIG. 2 shows the storage cassette shown together with the tray 4 in a sectional view taken on the line II—II in FIG. 1. FIG. 2 shows the bottom section with the swung-up cover section 3 with a tray 4 placed in the bottom section 2. The tray 4 carries a disc 21 which is held by means of the movable retaining element 9. The retaining element 9 is arranged on the leaf spring 10, which comprises a tongue 10a which points toward the grip member 6. Said tongue 10a of the leaf spring 10 has an aperture.

FIG. 2 shows the retaining element 9 in its normal position. In this normal position a disc 21 is clamped behind the retaining element 9. At the opposite side the disc is clamped between the retaining elements 7 and 8 of the tray 4 in a manner not shown in FIG. 2 (see FIG. 1).

For transport purposes the retaining element 9 together with the leaf spring 10 must be immobilised in the normal position. This is effected by means of the latching nose 12 arranged on the cover section 3, which latching nose engages the aperture in the tongue 10a of the leaf spring 10.

Figure 3:
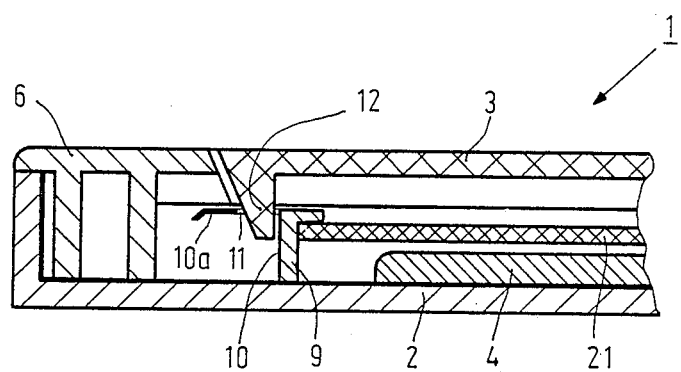
FIG. 3 is a section of the closed cassette with a disc therein.

FIG. 3 shows the storage cassette of FIG. 2 with the cover section 5 in its closed position. The latching nose 12 arranged on the cover section 3 engages the aperture in the tongue 10a of the leaf spring 10. In this way the movable retaining element 9 is immobilised in its normal position. The latching nose 12 engages the aperture with some clearance, so that the leaf spring 10 and hence the movable retaining element 9 are not subjected to any forces which might warp the inserted disc 21.

In the situation illustrated in FIG. 3, which also occurs during transport, the disc-shaped information carrier 21 is held in the storage cassette 1 in such a way that if the storage cassette is subject to shocks said carrier remains immobilised behind the retaining elements 7, 8 and 9, so that there is no risk of the information carrier being damaged or warped.

Thus there is described with respect to one embodiment the invention described more particularly by the claims which follows.

What is claimed is:

1. A storage cassette for an information disc comprising:
    a bottom tray section for receiving said information disc, having first and second rigid guides for limiting movement of said information disc in a first direction, and a movable, resilient guide opposite said first and second rigid guides, forming said disc into contact with said first and second rigid guides;
    a cover section hinged to said bottom tray, enclosing said information disc in a closed position, and permitting insertion and withdrawal of said information disc when said cover section is moved to an open position; and
    a latching element connected to said cover section for maintaining said resilient guide in position for retaining said information disc between said first and second guides when said cover section is in said closed position, and for permitting said resilient guide to be deflected away from said first and second guides when said cover section is in said open position.

2. The storage cassette of claim 1 wherein said resilient guide is deflectable from a first information disc holding position to a rearward releasing position, and includes a rearwardly extending member having an aperture for receiving said latching element when said cover is in a closed position.

3. The storage cassette of claim 2 wherein said rearwardly extending member is a leaf spring.

4. A storage cassette as claimed in claim 1, wherein the latching element on the cover section is constructed as a latching nose which in the closed position of the cover section locates behind the resilient guide in such a way that said resilient guide cannot be moved out of its normal position.

5. A storage cassette as claimed in claim 4, wherein near the pivotal axis of the cover section the tray is provided with the grip member and in that the resilient guide on the tray and the latching nose on the cover section are arranged in the proximity of the grip member.

* * * * *